(12) United States Patent
Nakamura et al.

(10) Patent No.: US 7,773,089 B2
(45) Date of Patent: Aug. 10, 2010

(54) DISPLAYING CHARACTER STRINGS BASED ON FONT INFORMATION

(75) Inventors: Tadashi Nakamura, Kanagawa (JP); Hiroshi Ueno, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/552,578

(22) Filed: Sep. 2, 2009

(65) Prior Publication Data
US 2010/0033487 A1 Feb. 11, 2010

Related U.S. Application Data

(63) Continuation of application No. 11/575,553, filed as application No. PCT/JP2005/021477 on Nov. 22, 2005, now Pat. No. 7,629,976.

(30) Foreign Application Priority Data
Dec. 3, 2004 (JP) ............................. 2004-352106

(51) Int. Cl.
*G06T 11/00* (2006.01)
(52) U.S. Cl. ...................................... 345/467; 715/255
(58) Field of Classification Search ........................ None
See application file for complete search history.

(56) References Cited

U.S. PATENT DOCUMENTS

| | | | |
|---|---|---|---|
| 4,408,198 A | 10/1983 | Kudirka | |
| 5,081,594 A | 1/1992 | Horsley | |
| 5,255,353 A | 10/1993 | Itoh | |
| 5,617,115 A | 4/1997 | Itoh et al. | |
| 5,742,838 A * | 4/1998 | Lim et al. | 715/264 |
| 5,778,213 A * | 7/1998 | Shakib et al. | 703/27 |
| 5,808,600 A | 9/1998 | Mochizuki | |
| 6,115,498 A | 9/2000 | Ro et al. | |
| 6,182,099 B1 * | 1/2001 | Nakasato | 715/236 |

(Continued)

FOREIGN PATENT DOCUMENTS

JP 62-192794 A 8/1987

(Continued)

OTHER PUBLICATIONS

Preliminary Rejection with Partial translation for Japanese Application 2004-352107 dated Apr. 15, 2008.

(Continued)

*Primary Examiner*—Kee M Tung
*Assistant Examiner*—David H Chu
(74) *Attorney, Agent, or Firm*—Matthew D. Dernier, Esq.; Gibson & Dernier LLP

(57) ABSTRACT

To provide a display device for enabling preferable Japanese hyphenation while suppressing restriction due to a character code system. A font data memory unit stores font data which contains a plurality of font records each containing font information for displaying a character and line feed control information for controlling line feed conducted before and/or after the character. A character string display unit displays a character string based on the font information relevant to all or some of the plurality of font records. A line feed control unit determines a line feed position in the character string being displayed by the character string display unit based on line feed control information relevant to characters included in the character string.

6 Claims, 15 Drawing Sheets

U.S. PATENT DOCUMENTS

| | | | |
|---|---|---|---|
| 6,252,589 B1 * | 6/2001 | Rettig et al. | 715/703 |
| 6,822,585 B1 * | 11/2004 | Ni et al. | 341/28 |
| 6,870,528 B2 * | 3/2005 | Ichikawa | 345/171 |
| 7,089,494 B1 * | 8/2006 | Burrell | 715/207 |
| 7,196,691 B1 * | 3/2007 | Zweig | 345/168 |
| 7,199,805 B1 | 4/2007 | Langmacher et al. | |
| 7,502,632 B2 * | 3/2009 | Ciminelli | 455/563 |
| 2004/0230912 A1 * | 11/2004 | Clow et al. | 715/773 |
| 2004/0267721 A1 * | 12/2004 | Meyerzon et al. | 707/3 |
| 2005/0086590 A1 * | 4/2005 | Lee et al. | 715/505 |
| 2005/0104869 A1 * | 5/2005 | Chung | 345/179 |
| 2005/0177582 A1 * | 8/2005 | Baird-Smith et al. | 707/100 |
| 2005/0283726 A1 * | 12/2005 | Lunati | 715/533 |
| 2006/0007157 A1 * | 1/2006 | Li et al. | 345/168 |
| 2006/0048055 A1 * | 3/2006 | Wu et al. | 715/535 |
| 2006/0210026 A1 * | 9/2006 | Duplessis et al. | 379/88.05 |
| 2006/0282583 A1 * | 12/2006 | Kung et al. | 710/67 |

FOREIGN PATENT DOCUMENTS

| | | | |
|---|---|---|---|
| JP | 63-289667 A | 11/1988 | |
| JP | 02181190 | 7/1990 | |
| JP | 3-2962 | 1/1991 | |
| JP | 3-43859 | 2/1991 | |
| JP | 03-163659 A | 7/1991 | |
| JP | 08-030586 A | 2/1996 | |
| JP | 08-263041 A | 10/1996 | |
| JP | 08-328534 A | 12/1996 | |
| JP | 11232276 A | 8/1999 | |
| JP | 2001-265314 A | 9/2001 | |
| KR | 2001-0042019 A | 5/2001 | |
| KR | 2002-0003855 A | 1/2002 | |

OTHER PUBLICATIONS

Preliminary Rejection with Partial translation for Japanese Application 2004-352108 dated Apr. 15, 2008.

Preliminary Rejection with Partial translation for Japanese Application 2004-352108 dated Jul. 1, 2008.

Preliminary Rejection with translation for Korean Application 10-2002-7015307 dated May 26, 2008.

Partial translation of Notice of Rejection for Japanese Application 2004-352106 dated Feb. 28, 2006.

Japanese Office Action for corresponding Japanese patent Application No. 2004-352107, Dec. 24, 2008.

Chinese Office Action for corresponding Chinese Patent application Patent application No. 200580034404.1, Apr. 17, 2009.

Korean Office Action for corresponding Korean Patent application Patent application No. 1020077015307, Nov. 25, 2008.

Japanese Office Action for corresponding Japanese patent Application No. 2004-352107, Sep. 30, 2008.

U.S. Appl. No. 11/575,553, which is the parent application under 35 U.S.C. § 120.

Office action for co-pending U.S. Appl. No. 11/575,553, dated Dec. 24, 2008.

* cited by examiner

FIG.9

| | |
|---|---|
| BLANK (FULL-WIDTH, HALF-WIDTH) | RIGID |
| NUMBER (FULL-WIDTH, HALF-WIDTH) | RIGID |
| ALPHABET (FULL-WIDTH, HALF-WIDTH) | RIGID |
| CHINESE CHARACTER | MODERATE |
| HIRAGANA | MODERATE |
| KATAKANA (FULL-WIDTH, HALF-WIDTH) | MODERATE |
| PUNCTUATION MARK "," (FULL-WIDTH, HALF-WIDTH) | RIGID |
| PUNCTUATION MARK "(" (FULL-WIDTH, HALF-WIDTH) | LOOSE |
| PUNCTUATION MARK ")" (FULL-WIDTH, HALF-WIDTH) | RIGID |

FIG.10

| | |
|---|---|
| BLANK (FULL-WIDTH, HALF-WIDTH) | LOOSE |
| NUMBER (FULL-WIDTH, HALF-WIDTH) | RIGID |
| ALPHABET (FULL-WIDTH, HALF-WIDTH) | RIGID |
| CHINESE CHARACTER | MODERATE |
| HIRAGANA | MODERATE |
| KATAKANA (FULL-WIDTH, HALF-WIDTH) | MODERATE |
| PUNCTUATION MARK "," (FULL-WIDTH, HALF-WIDTH) | LOOSE |
| PUNCTUATION MARK "(" (FULL-WIDTH, HALF-WIDTH) | RIGID |
| PUNCTUATION MARK ")" (FULL-WIDTH, HALF-WIDTH) | LOOSE |

FIG.11

| | |
|---|---|
| RIGID | 2 |
| MODERATE | 1 |
| LOOSE | 0 |

FIG.12

| KANJI CHARACTER | 6 |
|---|---|
| HIRAGANA | 5 |
| KATAKANA | 4 |
| ALPHABET | 3 |
| NUMBER | 2 |
| PUNCTUATION MARK | 1 |
| BLANK AND OTHERS | 0 |

FIG.17

(a) ABC の発売日は、１２月（中旬）です。

(b) ABC の発売

DISPLAYING CHARACTER STRINGS BASED ON FONT INFORMATION

CROSS REFERENCE TO RELATED APPLICATIONS

This application is a continuation application of U.S. patent application Ser. No. 11/575,553, filed Jun. 7, 2007, which is a 371 of international PCT application PCT/JP2005/021,477, the entire disclosures of which are incorporated by reference.

BACKGROUND ART

The present invention relates to a display device, a control method for the display device, and an information storage medium.

A display device, such as a portable game device, a home-use game device, a personal digital assistant (PDA), and a personal computer, for displaying a character string is known.

As a display device described above, a known device applies restriction (Japanese hyphenation), when inserting line feed depending on the width of a character string display area, such that a character which is preferably not located at the top of a line is prevented from being located at the top of a line and a character which is preferably not located at the end of a line is prevented from being located at the end of a line. For example, a known device holds a character code of a character which is preferably not displayed at either the top or end of a line, and performs control such that a character identified by the character code is prevented from being displayed at the top or end of a line.

Also, another device known as the above-described display device creates, on a real time basis, an associated image associated with a character to be displayed based on the font data of the character, and displays the associated image in association with that character. For example, a known device creates a shadow of a character on a real time basis, and attaches the shadow to that character to display a shadowed character.

Further, still another device known as the above-described display device offers assistance to allow a user to preferably designate a part of a character string displayed on a screen. More specifically, a character string is analyzed based on a user's designated position in a character string display area and a character code of each character constituting a character string, so that the part which the user intends to designate is estimated and displayed in a discriminable manner.

With the display device which applies the above-described Japanese hyphenation, a character code of a character to enable prevention of the character from being displayed at the top or end of a line is required to be set in advance. Therefore, there may be a case in which Japanese hyphenation is subjected to restriction due to a character code system. For example, there may be a case in which Japanese hyphenation cannot be applied when a character in an unknown character code system is displayed.

In addition, as a display device which displays an associated image in association with a character, as described above, creates, on a real time basis, an associated image to be displayed in association with the character, the processing load of the device is not light.

Still further, as a display device which offers an assistance to enable designation of a part of a character string, as described above, analyzes the character string based on a character code, there may be a case in which the display device is subjected to restriction due to the character code system.

The present invention has been conceived in view of the above. A first object of the present invention is to provide a display device, a control method for the display device, and a information storage medium capable of preferable application of Japanese hyphenation while suppressing restriction due to a character code system.

A second object of the present invention is to provide a display device, a control method for the display device, and an information storage medium capable of displaying an associated image associated with a character while reducing the processing load.

Further, a third object of the present invention is to provide a display device, a control method for the display device, and an information storage medium capable of allowing a user to preferably designate a part of a character string while suppressing restriction due to a character code system.

SUMMARY DISCLOSURE OF INVENTION

In order to solve the above described problems, according to the present invention, there is provided a display device, comprising: font data memory means for storing font data which contains a plurality of font records each containing font information for displaying a character and line feed control information for controlling line feed conducted before and/or after the character; character string displaying means for displaying a character string based on the font information relevant to all or some of the plurality of font records; and line feed control means for determining a line feed position in the character string being displayed by the character string displaying means, based on the line feed control information relevant to characters included in the character string.

Also, according to the present invention, there is provided a control method for a display device, comprising: a font data reading step of reading font data from font data memory means which stores the font data which contains a plurality of font records each containing font information for displaying a character and line feed control information for controlling line feed conducted before and/or after the character; a character string displaying step of displaying a character string by character string displaying means based on the font information relevant to all or some of the plurality of font records contained in the font data which is read at the font data reading step; and a line feed control step of determining a line feed position in the character string being displayed by the character string displaying means, based on the line feed control information relevant to characters included in the character string.

Also, according to the present invention, there is provided a program for causing a computer, such as a portable game device, a home-use game device, a commercial game device, a portable phone, a personal digital assistant (PDA), a personal computer, and so forth, to function as character string displaying means for displaying a character string based on font information relevant to all or some of a plurality of font records contained in font data which contains the plurality of font records each containing font information for displaying a character and line feed control information for controlling line feed conducted before and/or after the character; and line feed control means for determining a line feed position in the character string being displayed by the character string displaying means, based on the line feed control information relevant to characters included in the character string.

The font data according to the present invention may be font data which contains a plurality of font records each containing font information for displaying a character and line feed control information for controlling line feed conducted before and/or after the character.

The information storage medium according to the present invention may be a computer readable information storage medium which stores at least one of the program and the font data.

According to the present invention, font data which contains a plurality of font records each containing font information for displaying a character and line feed control information for controlling line feed conducted before and/or after the character may be stored. Also, a character string may be displayed based on the font information relevant to all or some of the plurality of font records. Further, the line feed position in the character string being displayed may be determined based on the line feed control information relevant to characters included in the character string.

According to the present invention, line feed control information for controlling line feed which is conducted before and/or after a character may be contained in font data, and a line feed position when displaying a character string may be determined based on the line feed control information. Therefore, Japanese hyphenation can be preferably applied while suppressing restriction due to a character code system.

It should be noted that, in this specification, a "character" may include, for example, a kanji character, hiragana, katakana, number, and so forth. A "character" may also include, for example, a character, such as an alphabetic character, Cyrillic character, Hangul character, Thai character, Traditional Chinese character, Simplified Chinese character, and so forth, which correspond to languages other than Japanese. Moreover, a "character" may also include, for example, a punctuation mark (a symbol), such as "(" and ")", a blank, and so forth.

According to one aspect of the present invention, the line feed control information may include first line feed control information for controlling line feed conducted before the character, and second line feed control information for controlling line feed conducted after the character, and the line feed control means may execute, for at least some of the adjacent characters in the character string, predetermined processing based on the second line feed control information relevant to the first character of two adjacent characters and the first line feed control information relevant to the second character of the two adjacent characters, and determine the line feed position based on the result of the execution.

According to another aspect of the present invention, the first line feed control information and the second line feed control information may both be numeric value information, the line feed control means may execute, for at least some of the adjacent characters in the character string, a predetermined operation based on the second line feed control information relevant to the first character of two adjacent characters and the first line feed control information relevant to the second character of the two adjacent characters, and determine the line feed position based on the result of the operation.

According to still another aspect of the present invention, the font record further may comprise type information indicative of the type of a character, and the line feed control means may determine the line feed position further based on the type information relevant to characters included in the character string.

According to the present invention, there is provided a display device, comprising font data memory means for storing font data which contains a plurality of font records each containing font information for displaying a character and associated image information for displaying an associated image associated with the character in the manner of being associated with the character; and displaying means for displaying a character based on the font information and the associated image in the manner of being associated with the character based on the associated image information corresponding to the font information.

According to the present invention, there is provided a control method for a display device, comprising a font data reading step of reading font data from font data memory means which stores the font data which contains a plurality of font records each containing font information for displaying a character and associated image information for displaying an associated image associated with the character in the manner of being associated with the character; and a displaying step of displaying a character by displaying means based on the font information contained in the font data read at the font data reading step, and displaying the associated image in the manner of being associated with the character based on the associated image information corresponding to the font information.

According to the present invention, there is provided a program for causing a computer, such as a portable game device, a home-use game device, a commercial game device, a portable phone, a personal digital assistant (PDA), a personal computer, and so forth, to function as displaying means for displaying a character based on the font information contained in font data which contains a plurality of font records each containing font information for displaying a character and associated image information for displaying an associated image associated with the character in the manner of being associated with the character, and displaying the associated image in the manner of being associated with the character based on the associated image information corresponding to the font information.

The font data according to the present invention may be font data which contains a plurality of font records each containing font information for displaying a character and associated image information for displaying an associated image associated with the character in the manner of being associated with the character.

The information storage medium according to the present invention may be a computer readable information storage medium which stores at least one of the program and the font data.

According to the present invention, font data which contains a plurality of font records each containing font information for displaying a character and associated image information for displaying an associated image associated with the character in the manner of being associated with the character may be stored. Then, a character may be displayed based on the font information, and the associated image may be displayed in the manner of being associated with the character based on the associated image information corresponding to the font information.

According to the present invention, the font data may contain associated image information for displaying an associated image associated with a character in the manner of being associated with the character, and an associated image associated with a character can be displayed based on this associated image information. This makes it possible to display an associated image associated with a character while reducing the processing load.

Also, according to one aspect of the present invention, the font data may contain a plurality of associated image data representing the associated image, and at least a part of the associated image information may be associated image data specification information for specifying any of the plurality of associated image data. The displaying means may display a character based on the font information, and also display, when the associated image information corresponding to the font information is the associated image data specifying information, the associated image represented by the associated image data specified according to the associated image data specifying information, in the manner of being associated with the character.

Also, according to another aspect of the present invention, associated image information other than at least the part of the associated image information may be the associated image data itself.

Also, according to one aspect of the present invention, the associated image may be a shadow image of the character.

According to the present invention, there is provided a display device, comprising font data memory means for storing font data which contains a plurality of font records each containing font information for displaying a character and type information indicative of a type of the character; character string displaying means for displaying a character string based on the font information relevant to all or some of the plurality of font records; selection reference position designation means for designating a position within a display area, of the character string displayed in the character string displaying means, as a selection reference position; selection means for selecting a part of the character string based on the selection reference position designated by the selection reference position designation means and the type information of characters included in the character string; and process executing means for executing a process based on the part of the character string selected by the selection means.

According to the present invention, there is provided a control method for a display device, comprising: a font data reading step of reading font data from font data memory means which stores font data which contains a plurality of font records each containing font information for displaying a character and type information indicative of a type of the character; a character string displaying step of displaying a character string by a character string displaying means based on the font information relevant to all or some of the plurality of font records contained in the font data which is read out at the font data reading step; a selection reference position designation step of designating a position within a display area, of the character string displayed in the character string displaying means, as a selection reference position; a selection step of selecting a part of the character string based on the selection reference position designated at the selection reference position designation step and the type information of characters included in the character string; and a process executing step of executing a process based on the part of the character string selected at the selection step.

According to the present invention, there is provided a program for causing a computer, such as a portable game device, a home-use game device, a commercial game device, a portable phone, a personal digital assistant (PDA), a personal computer, and so forth, to function as: character string displaying means for displaying a character string based on font information relevant to all or some of a plurality of font records contained in font data which contains the plurality of font records each containing the font information for displaying a character and type information indicative of a type of the character; selection reference position designation means for designating a position within a display area, of the character string displayed in the character string displaying means, as a selection reference position; selection means for selecting a part of the character string based on the selection reference position designated by the selection reference position designation means and the type information of characters included in the character string; and process executing means for executing a process based on the part of the character string selected by the selection means.

The font data according to the present invention may be font data which contains a plurality of font records each containing font information for displaying a character and type information indicative of a type of the character.

The information storage medium according to the present invention may be a computer readable information storage medium which stores at least one of the program and the font data.

According to the present invention, font data which contains a plurality of font records, each containing font information for displaying a character and type information indicative of a type of the character, may be stored. A character string may be displayed based on the font information relevant to all or some of the plurality of font records. When a position within a display area of the character string is designated as a selection reference position, a part of the character string may be selected based on the selection reference position and the type information of characters included in the character string. Then, a process (for example, a process to discimininably display the part) may be executed based on the part.

According to the present invention, type information indicative of the type of a character may be contained in the font data, and a part of the character string may be selected based on the type information. This enables a user's preferable designation of a part of the character string while avoiding restriction due to the character code system.

According to one aspect of the present invention, the selection means may comprise beginning character selection means for selecting a beginning character from the characters located ahead of the selection reference position in the character string, based on the type information, and terminal character selection means for selecting a terminal character from the characters located subsequent to the selection reference position in the character string, based on the type information, wherein apart of the character string may be selected based on the beginning character and the terminal character.

Also, according to one aspect of the present invention, the beginning character selection means may determine, for two adjacent characters located ahead of the selection reference position in the character string, whether or not the type information relevant to the two adjacent characters satisfy a predetermined beginning character condition, and select the beginning character based on the result of the determination.

Further, according to one aspect of the present invention, the terminal character selection means may determine, for two adjacent characters located subsequent to the selection reference position in the character string, whether or not the type information relevant to the two adjacent characters satisfy a predetermined terminal character condition, and select the terminal character based on the result of the determination.

BRIEF DESCRIPTION OF DRAWINGS

FIG. 9 is a diagram showing first line feed control information;

FIG. 10 is a diagram showing second line feed control information;

FIG. 11 is a diagram showing a line feed control information digitizing table;

FIG. 12 is a diagram showing character type information;

FIG. 17 is a diagram showing one example of a character string to be displayed in a liquid crystal display of the portable electronic device.

DETAILED DESCRIPTION OF THE INVENTION

In the following, one example of an embodiment according to the present invention will be described in detailed based on the accompanying drawings.

Here, while referring to a portable electronic device which functions as a portable game device, a portable music player, or a personal digital assistant (PDA), a case in which a display device according to an embodiment of the present invention is realized will be described as an example.

Figure 1:
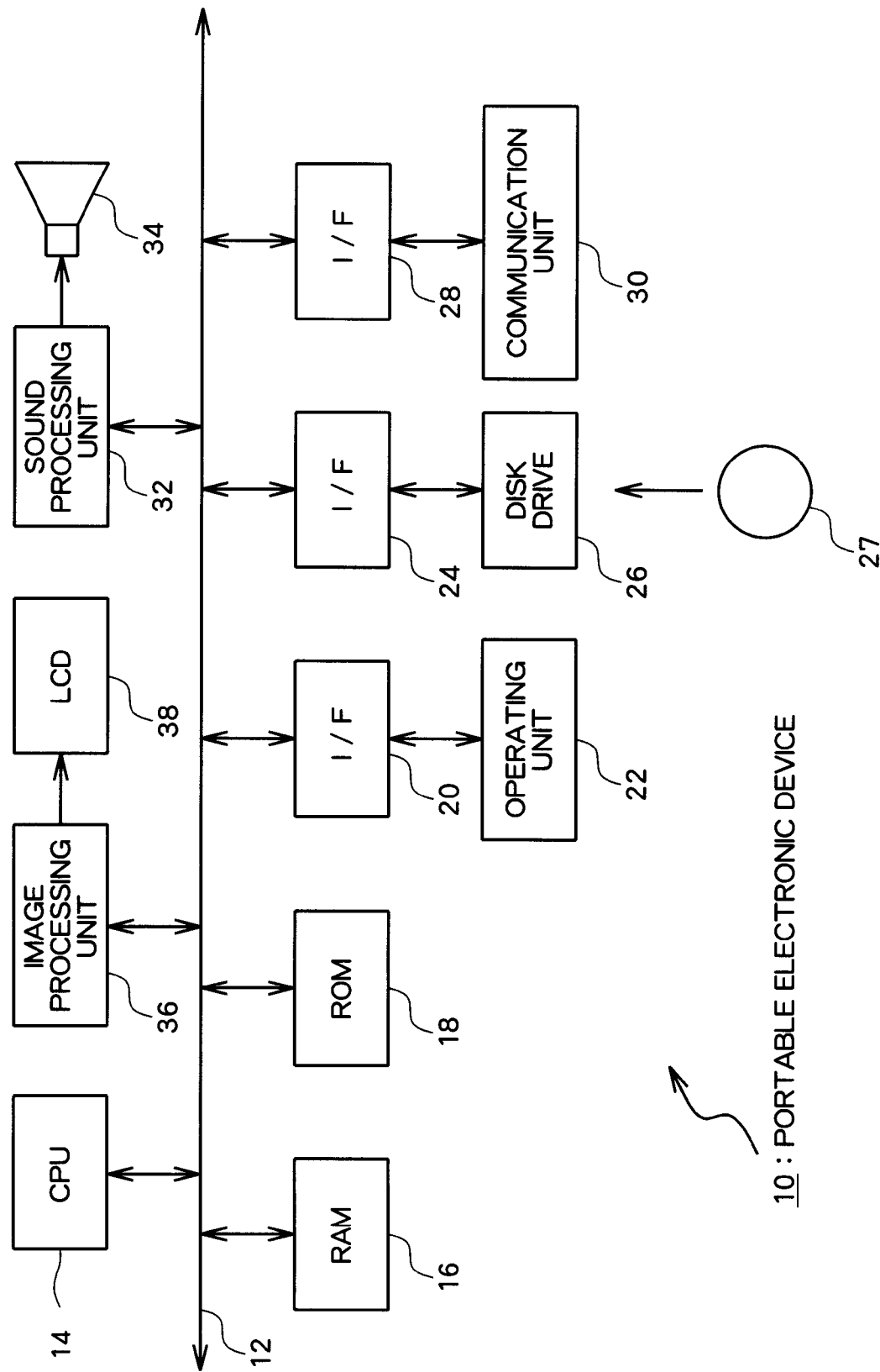
FIG. 1 is a diagram showing a hardware structure of a portable electronic device according to this embodiment.

FIG. 1 is a diagram showing a hardware structure of a portable electronic device 10 according to an embodiment of the present invention display device. As shown in FIG. 1, in the portable electronic device 10, a CPU (Central Processing Unit) 14, a RAM (Random Access Memory) 16, a ROM (Read Only Memory) 18, interfaces (I/F) 20, 24, 28, a sound processing unit 32, and an image processing unit 36 are connected via a bus 12 so as to enable mutual data communication. An operating unit 22 is connected to the interface 20, and a disk drive 26 is connected to the interface 24. Further, a communication unit 30 is connected to the interface 28. Also, a speaker 34 is connected to the sound processing unit 32, and a liquid crystal display (LCD) 38 is connected to the image processing unit 36. These units are all accommodated, together with a battery, within the enclosure of the portable electronic device 10 so as to be driven by the battery, which makes the portable electronic device 10 portable.

Based on an operating system (OS) stored in the ROM 18 or a program read from the disk 27, the CPU 14 controls the respective units of the portable electronic device 10. The use of the bus 12 enables exchange of an address and data among the respective units of the portable electronic device 10. A program read from the disk 27 is written into the RAM 16 upon necessity. The RAM 16 is also used as a working memory for the CPU 14. The sound processing unit 32 reproduces various sound data including a game music, a game sound effect, or a message, to be output via the speaker 34. The image processing unit 36 processes image data supplied from the CPU 14, so that the processed image data is output as being displayed in the LCD 38.

The interfaces 20, 24, 28 relay data communication between the CPU 14 and the operating unit 22, the disk drive 26, and the communication unit 30, respectively. The operating unit 22 serves as an input means via which a user carries out various operations. The disk drive 26 reads a program or data recorded in the disk 27 in response to a command supplied from the CPU 14. The communication unit 30 carries out data communication with other computers (other information-processing devices) via a communication network.

It should be noted that, although a program is supplied to the portable electronic device 10 via a disk 27 which serves as an information storage medium in the above, a program may alternatively be supplied from a remote place to the portable electronic device 10 via a communication network such as the Internet. Still alternatively, a program may be supplied to the portable electronic device 10 by utilizing a variety of data communications such as infrared-ray communication.

Next, a specific technique for realizing a display device capable of (1) carrying out Japanese hyphenation while suppressing restriction due to a character code system, (2) displaying an associated image associated with a character while reducing the processing load, and (3) allowing a user to preferably designate a part of a character string while suppressing restriction due to the character code system, will be described.

Figure 2:
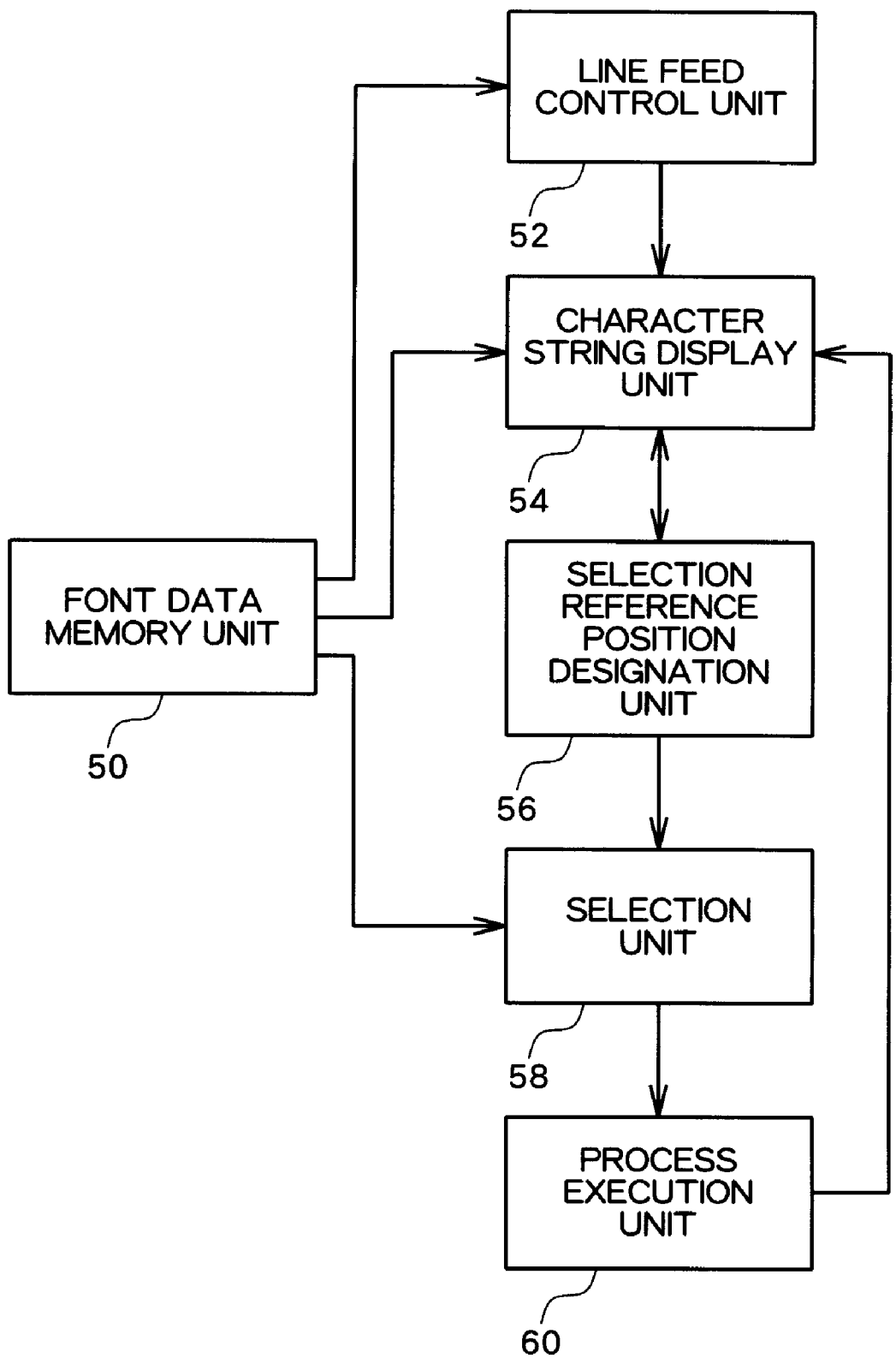
FIG. 2 is a functional block diagram of a portable electronic device according to this embodiment.

FIG. 2 is a functional block diagram showing mainly the functions associated with the present invention among various functions realized by the portable electronic device 10. As shown in FIG. 2, in the portable electronic device 10, a font data memory unit 50, a line feed control unit 52, a character string display unit 54, a selection reference position designation unit 56, a selection unit 58, and a process execution unit 60 are realized. These functions are realized by executing a program supplied via the disk 27 by the CPU 14.

[1. Font Data Memory Unit]

The font data memory unit 50 is formed by, for example, the ROM 18, the disk 27, or the like. The font data memory unit 50 stores font data.

Figure 3:
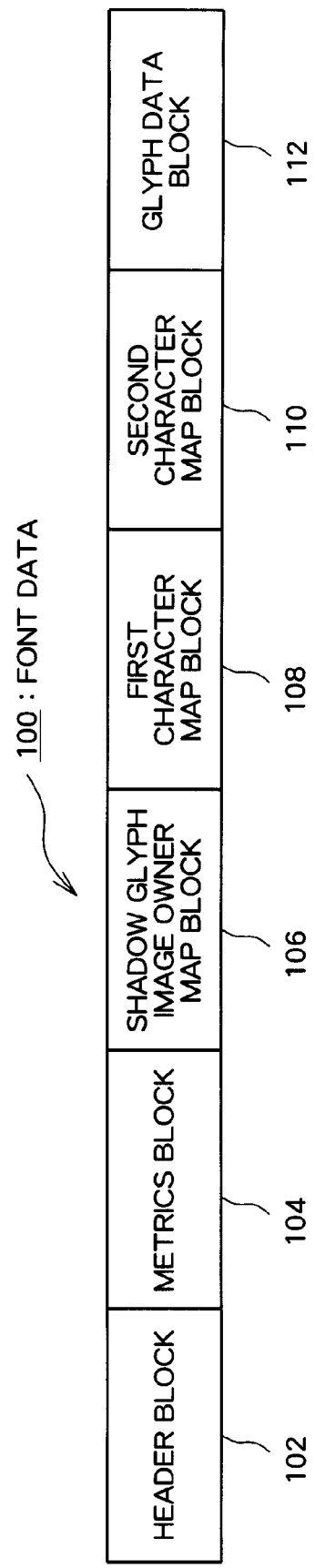
FIG. 3 is a diagram showing a structure of font data.

FIG. 3 shows a structure of font data stored in the font data memory unit 50. As shown in FIG. 3, the font data 100 is constructed comprising a header block 102, a metrics block 104, a shadow glyph image owner map block 106, a first character map block 108, a second character map block 110, and a glyph data block 112.

Figure 4:
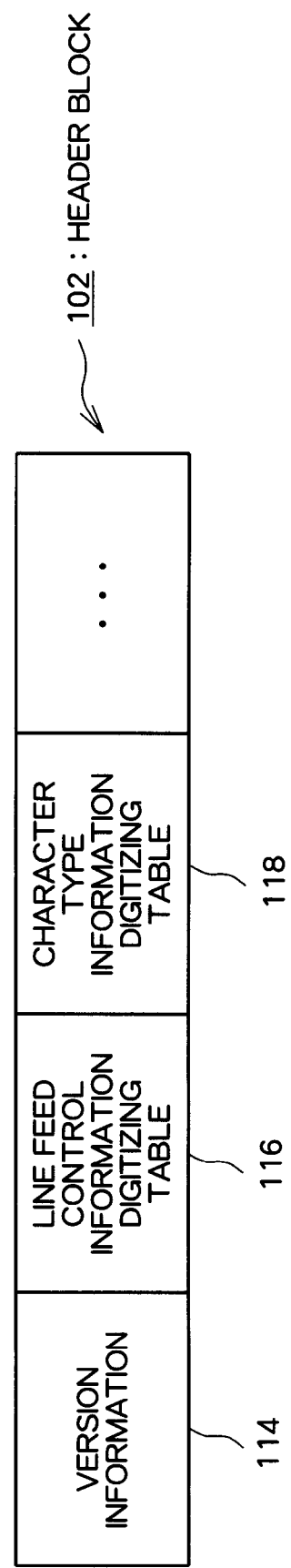
FIG. 4 is a diagram showing a structure of a header block.

FIG. 4 shows a structure of the header block 102. As shown in FIG. 4, the header block 102 holds version information 114, a line feed control information digitizing table 116, and a character type information digitizing table 118. The version information 114 is information telling the version of the font data.

The line feed control information digitizing table 116 is information for use in digitizing line feed control information to be described later (see FIG. 11). The character type information digitizing table 118 is information for use in digitizing character type information to be described later (see FIG. 12). The header block 102 stores various other information.

The metrics block 104 holds metrics information (information concerning the layout of a typeface of a character), such as character rectangle information (width and height), and so forth. The shadow glyph image owner map block 106 is to be described later (see FIG. 7).

The first character map block 108 holds a list of character codes. In the first character map block 108, only some of the character codes are set corresponding to character numbers. More specifically, only a character code having font information held in the font data is set corresponding to a character number. It should be noted that a character number is information for uniquely discriminating a character glyph image (glyph data) to be described later.

The second character map block 110 holds a list of character numbers. In the second character map block 110, each character number is set corresponding to information for specifying an area where the glyph data (a font record) of the concerned character is held. It should be noted that the glyph data of each character is held in the glyph data block 112, to be described later.

Figure 5:
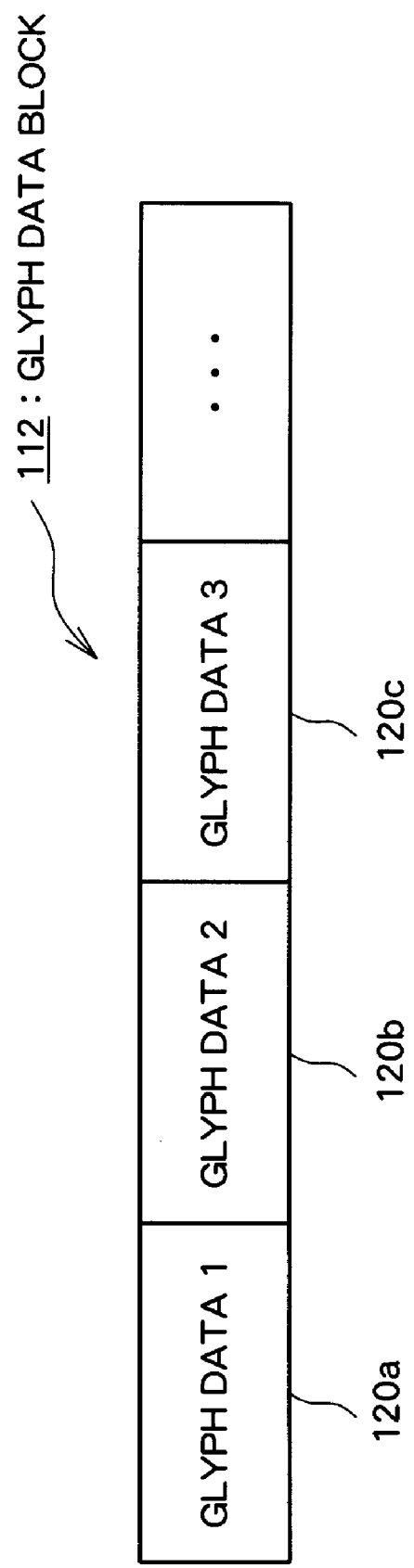
FIG. 5 is a diagram showing a structure of a glyph data block.

FIG. 5 shows a structure of the glyph data block 112. As shown in FIG. 5, the glyph data block 112 holds a plurality of glyph data 120a, 120b, 120c, and so forth.

Figure 6:
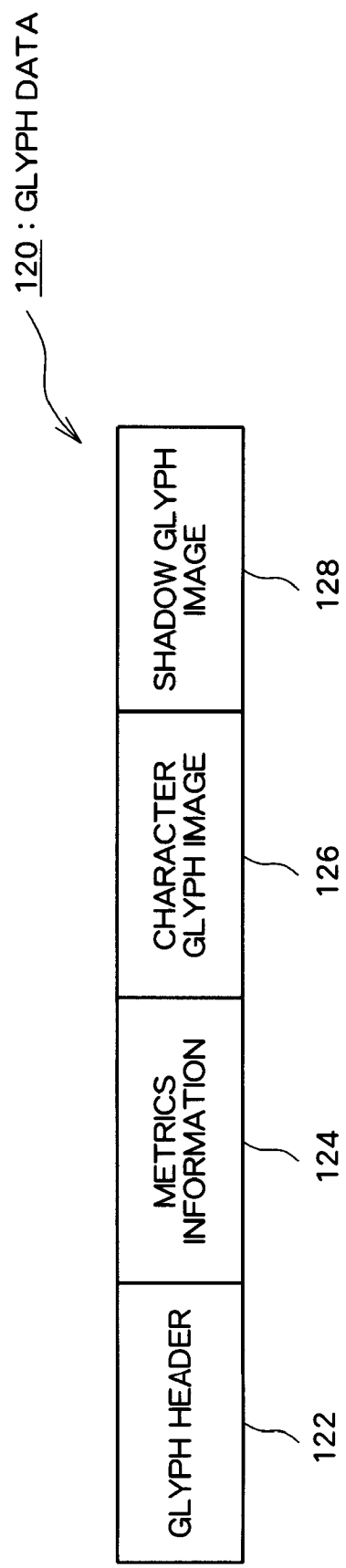
FIG. 6 is a diagram showing a structure of glyph data.

FIG. 6 shows a structure of one item of glyph data 120 (a font record). As shown in FIG. 6, the glyph data 120 contains a glyph header 122, metrics information 124, a character glyph image 126 (font information), and a shadow glyph image 128 (associated image data). The glyph header 122 is to be described later (see FIG. 8). The metrics information 124 is information such as character rectangle information (width and height). The metrics information may be held in the metrics block 104, or in the glyph data 120 for every character. The character glyph image 126 is information representing the design (shape) of a character. The shadow glyph image 128 is information representing the design (shape) of a shadow to be added when the character (a character expressed using a character glyph image) is displayed as a shadowed character.

In this embodiment, a shadow glyph image 128 is not included in all glyph data 120 but in only some of the glyph data 120. Specifically, for a character to which a shadow can be added by using a shadow glyph image 128 contained in the glyph data 120 of other characters, the glyph data 120 of that character does not contain a shadow glyph image 128. In this embodiment, the data size of the font data 100 is suppressed in this manner.

Figure 7:
FIG. 7 is a diagram showing a structure of a shadow glyph image owner map block.

It should be noted that which glyph data 120 contains shadow glyph image 128 can be known by referring to the shadow glyph image owner map block 106. Specifically, the shadow glyph image owner map block 106 holds a list of character numbers relevant to the glyph data 120 which contains a shadow glyph image 128, as shown in FIG. 7.

Figure 8:
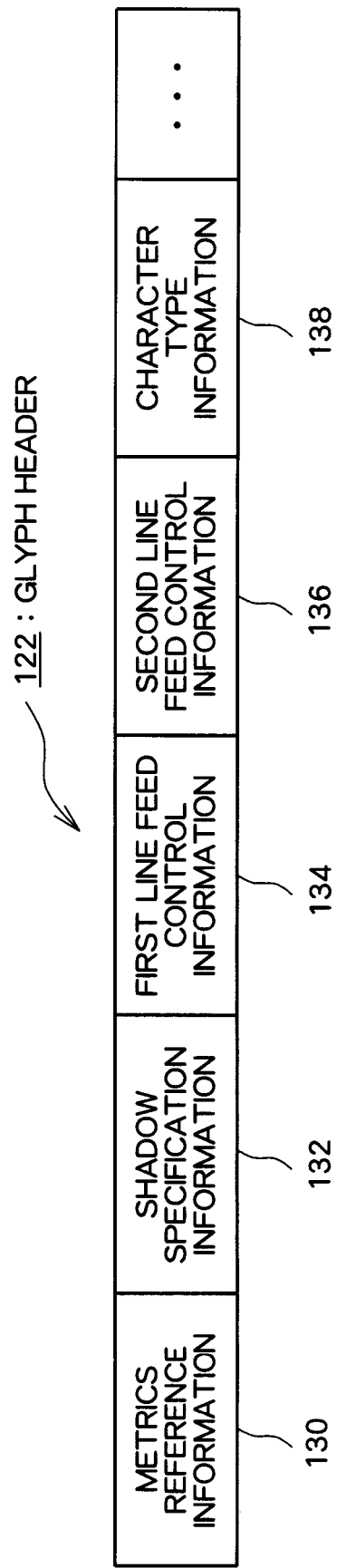
FIG. 8 is a diagram showing a structure of a glyph header.

FIG. 8 shows a structure of a glyph header 122. As shown in FIG. 8, the glyph header 122 contains metrics reference information 130, shadow specification information 132 (associated image data specification information), first line feed control information 134, second line feed control information 136, and character type information 138 (type information). It should be noted that the glyph header 122 may hold various other information concerning the glyph data 120. The metrics reference information 130 is information indicating which of the metrics block 104 and the glyph data 120 the metrics information of the concerned character is held. Also, when the metrics information is held in the metrics block 104, the metrics reference information 130 contains information for specifying a memory area where the metrics information is held (information for specifying a referent in the metrics block 104).

The shadow specification information 132 is information for specifying a shadow glyph image 128 which should be used when a shadow is added to "a character expressed using the character glyph image 126 contained in the glyph data 120". Specifically, the shadow specification information 132 is information for specifying any of the plurality of "character numbers relating to the shadow glyph images" held in the shadow glyph image owner map block 106.

The first line feed control information 134 is information for controlling (restricting) line feed to be conducted before "a character expressed using the character glyph image 126 contained in the glyph data 120". In this embodiment, the first line feed control information 134 indicates rigidity of the connection with the preceding character. For example, any of "loose", "moderate", and "rigid" is held as first line feed control information 134. Also, in this embodiment, as shown in FIG. 9, for example, first line feed control information is set for each character. It should be noted that although uniform first line feed control information is set for every character type, excluding a punctuation mark, in the example shown in FIG. 9, different first line feed control information may be set for every character.

The second line feed control information 136 is information for controlling (restriction) line feed to be conducted after "a character expressed using the character glyph image 126 contained in the glyph data 120". In this embodiment, the second line feed control information 136 indicates rigidity of the connection with the subsequent character. For example, similar to the first line feed control information 134, any of "loose", "moderate", and "rigid" is held as second line feed control information 136. Also, in this embodiment, as shown in FIG. 10, for example, second line feed control information is set for each character. It should be noted that although uniform second line feed control information is set for every character type, excluding a punctuation mark, in the example shown in FIG. 10, different second line feed control information may be set for every character.

It should be noted that, as described above, the header block 102 holds a line feed control information digitizing table 116 for converting each of the first line feed control information and the second line feed control information into a numeric value. The line feed control information digitizing table 116 holds information as shown in FIG. 11, for example. In this embodiment, when a process based on the first line feed control information or the second line feed control information is carried out, the numeric value obtained by digitizing the first line feed control information 134 or the second line feed control information 136 (abstract information) using the line feed control information digitizing table 116, is used, instead of directly using the first line feed control information 134 or the second line feed control information 136 (abstract information) held in the glyph header 122.

Therefore, even when the need arises to amend the first line feed control information or the second line feed control information, the need can be satisfied by changing only the content of the line feed control information digitizing table 116, without changing the content of each glyph header 122. It should be noted that numeric value information may be held in the glyph header 122 as the first line feed control information 134 and the second line feed control information 136.

The character type information 138 is information indicating the type of "a character expressed using the character glyph image 126 contained in the glyph data 120". In this embodiment, any of "kanji character", "hiragana", "katakana", "alphabetic character", "number", "punctuation mark", and "blank and others" is held as character type information 138. Alternatively, as the character type information 138 is not limited to those described above, any information indicating the character type (classification) of languages other than Japanese, including, for example, "Cyrillic character", "Hangul character", "That character", "Traditional Chinese character", and "Simplified Chinese character", may be held as character type information 138. Also, information indicating a language in which that character is used, for example, "Japanese", "English", "Russian", "Hangul", "That", "Chinese", may be held as character type information 138.

Further, for example, information representing "a full-width character" or "a half-width character" may be held as character type information 138. Also, character type information corresponding to one character may be information representing one character type or combination of a plurality of character types. For example, to "a full-width alphabetic character", character type information representing a combination of an "alphabetic character" and "a full-width" may be correspondingly set. In other words, information representing "an alphabetic character" and information indicating "a full-width" may be set corresponding to "a full-width alphabetic character" as character type information.

It should be noted that, as described above, the header block 102 holds a character type information digitizing table 118 for converting the character type information into a numeric value. The character type digitizing table 118 holds information as shown in FIG. 12, for example. In this embodiment, when a process based on the character type information is carried out, the metric value obtained by digitizing the character type information 138 (abstract information) using the character type information digitizing table 118 is used, instead of directly using the character type information 138 (abstract information) held in the glyph header 122. Therefore, even when the need arises to amend the setting of the character type information, the need can be satisfied by changing only the content of the character type information digitizing table 118 without changing the content of each glyph header 122. It should be noted that numeric value information may be held in the glyph header 122, as character type information 138.

[2. Character String Display Unit]

The character string display unit 54 is formed mainly by an image processing unit 36 and an LCD 38. The character string display unit 54 displays a character string according to a command sent from the CPU 14. The character string display unit 54 carries out a process to display a character string based on the font data stored in the font data memory unit 50. Specifically, the character string display unit 54 reads out a character glyph image for each character included in a character string to be displayed (a displaying character string), from the font data. Then, according to the read character glyph image, the character string display unit 54 displays each character included in the character string.

Also, the character string display unit 54 (displaying means) can display the character string designated by the CPU 14 in the form of a shadowed character. The character string display unit 54 reads a shadow glyph image corresponding to each character contained in the displaying character string from the font data. Then, to each character included in the character string, a shadow is added according to the shadow glyph image corresponding to that character. That is, to each character included in the character string, a shadow expressed using the shadow glyph image read out for that character is added.

It should be noted that the character string display unit 54 may modify the size of at least one of a character expressed using a character glyph image and a shadow expressed using a shadow glyph image before display. Also, the character string display unit 54 may display only a shadow expressed using the shadow glyph image.

[3. Line Feed Control Unit]

The line feed control unit 52 determines a line feed position in a character string being displayed by the character string display unit 54, based on the first line feed control information and the second line feed control information both relevant to characters included in the character string.

Specifically, for at least some of the characters adjacent to each other (adjacent characters) in the character string, the line feed control unit 52 executes predetermined processing based on the second line feed control information of the first one of two adjacent characters and the first line feed control information of the second one of the two adjacent characters, and determines a line feed position based on the result of the executed processing.

Specifically, for at least some of the adjacent characters in the character string, the line feed control unit 52 carries out a predetermined operation based on the numeric value obtained by digitizing the second line feed control information of the first one of two adjacent characters and the numeric value obtained by digitizing the first line feed control information of the second one of the two adjacent characters, and determines a line feed position based on the result of the operation.

It should be noted that the line feed control unit 52 may alternatively determine a line feed position in the character string being displayed by the character string display unit 54 based on the character type information relevant to characters included in the character string.

Figure 13:
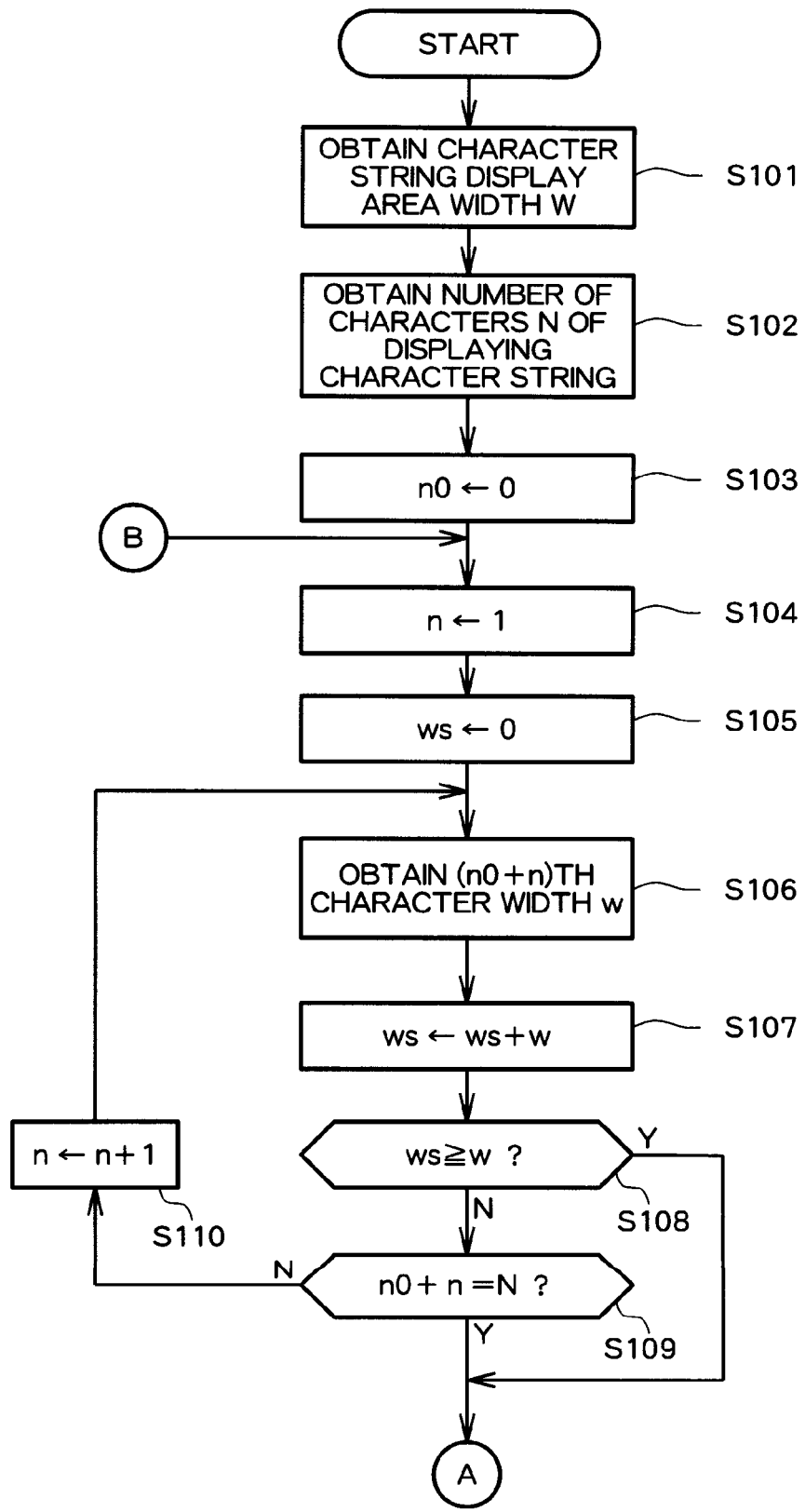
FIG. 13 is a flowchart showing processing to be executed by a portable electronic device.
Figure 14:
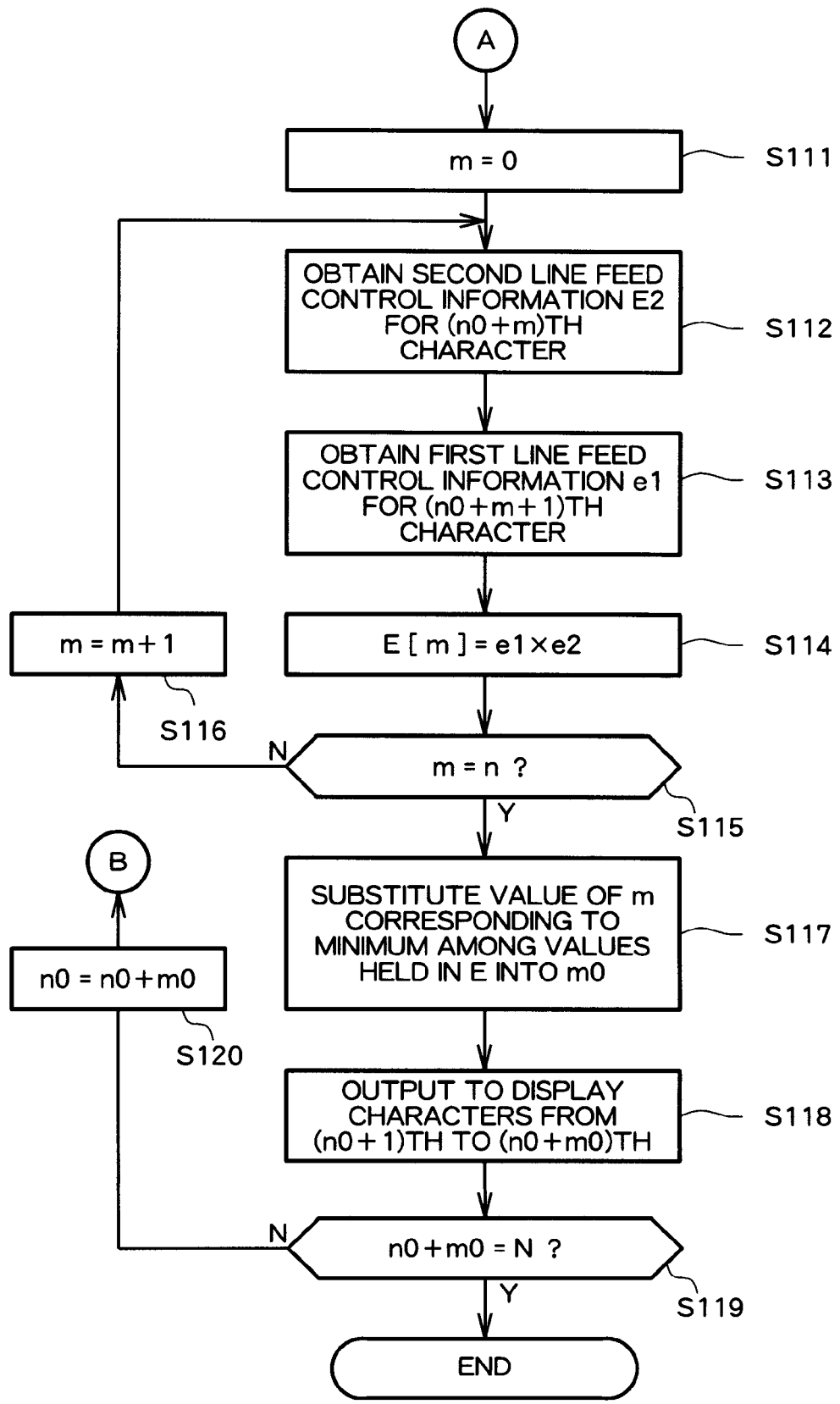
FIG. 14 is a flowchart showing processing to be executed by the portable electronic device.

Here, processing to be executed by the character string display unit 54 and the line feed control unit 52 in order to display a displaying character string in the LCD 38 will be described. FIGS. 13 and 14 are flowcharts showing the processing.

In this processing, the character string display unit 54 obtains the width W of the area where the character string is to be displayed (S101). Thereafter, the character string display unit 54 obtains the number N of the characters of the displaying character string (S102). Also, the character string display unit 54 initializes the variable n0 to zero (S103). Further, the character string display unit 54 initializes the variable n to one (S104), and the variable ws to zero (S105). Thereafter, the character string display unit 54 defines the (n0+n)-th character as the noted character and executes processing at S106 through S109.

The character string display unit 54 obtains the width w which is necessary to display the (n0+n)-th character (S106). Specifically, the character string display unit 54 obtains a character code of the (n0+n)-th character. Thereafter, by referring to the first character map block 108, the character string display unit 54 obtains the character number corresponding to the character code. Then, by referring to the second character map block 110, the character string display unit 54 obtains information for specifying an area where the glyph data associated with that character number is held. Subsequently, the character string display unit 54 refers to the metrics reference information 130 held in the glyph header 122. Then, in accordance with the metrics reference information 130 and by referring to the character rectangle information held in the metrics block 104 or glyph data 120, the character string display unit 54 obtains the width w which is necessary to display the character.

Further, the character string display unit 54 updates the value of the variable ws to be ws+w (S107). The value of the variable ws, which is updated as described above, represents the total width which is necessary to display the respective characters from the (n0+1)-th to (n0+n)-th characters included in the displaying character string.

Then, the character string display unit 54 determines whether or not the value of the variable ws is equal to or larger than W which is obtained at S101 (S108). When it is determined that the value of the variable ws is smaller than W, the character string display unit 54 then determines whether or not (n0+n) is equal to N which is obtained at S102 (S109). That is, whether or not the (n0+n)-th character is an ending character of the displaying character string is determined. When it is determined that (n0+n) is not equal to N, the character string display unit 54 increments the variable n (S110) and repeats the processing at S106 through S109.

On the other hand, when it is determined that the value of the variable ws is equal to or larger than W (S108), or that the (n0+n)-th character is an ending character (S109), it is determined that the (n0+1)-th through (n0+n)-th characters of the displaying character string together constitute a character string which can be displayed in one line in a character string display area (hereinafter referred to as a displayable character string), and the processing at S110 through S120 is executed.

Figure 17:
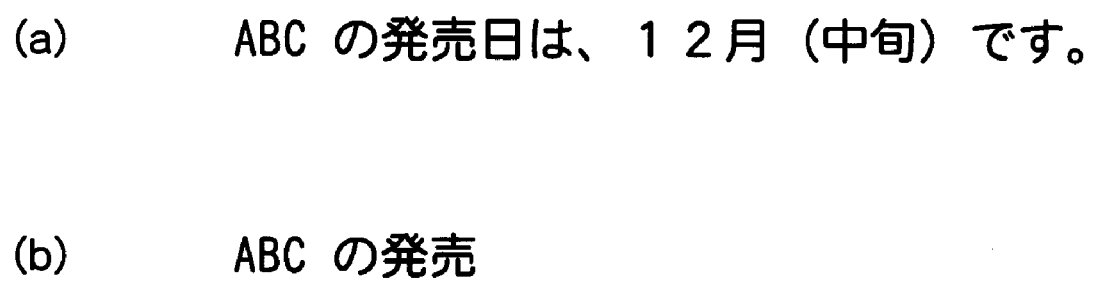

It should be noted that, supposing that a full-width character and a half-width character respectively have fixed widths, that the width of a full-width character is twice as wide as a half-width character, and that the character string display area is wide enough to display five full-width characters, when the character string (an object character string) shown in FIG. 17(*a*) is intended to be displayed in the LCD 38, for example, an initial displayable character string (a displayable character string with the variable n0 being zero) which is obtained by executing the processing at S106 through S109 is the character string shown in FIG. 17(*b*). Here, the character string shown in FIG. 17(*a*) is a character string reading as "a publication date of ABC is in December (middle)" written in Japanese. As shown in FIG. 17(*a*), the character string is constituted of twenty characters. The fourth character of the character string shown in FIG. 17(*a*) is a half-width space. As the first to fourth characters in the character string shown in FIG. 17(*a*) are half-width characters, while the fifth through twentieth characters are full-width characters. The character types of the fifth, ninth, eighteenth, and nineteenth characters of the character string shown in FIG. 17(*a*) are hiragana, while those of the sixth through eighth, thirteenth, fifteenth, and sixteenth character are kanji character.

Thereafter, the line feed control unit 52 executes processing at S111 through S120 to thereby determine a line feed position in the displayable character string. In other words, up to the N-th character in the displayable character string is to be output as next one line to the character string display unit 54 (a character string display area) is determined.

Initially, the line feed control unit 52 initializes the variable m to zero (S111). Thereafter, the line feed control unit 52 obtains the value e2 by digitizing the second line feed control information of the (n0+m)-th character (S112). Specifically, the line feed control unit 52 obtains the character code of the (n0+m)-th character. Then, similar to the processing at S106, by referring to the glyph header 122 of the glyph data 120 corresponding to the character code, the second line feed control information 136 is obtained. Further, the line feed control unit 52 digitizes the obtained second line feed control information 136 based on the line feed control information digitizing table 116 which is held in the header block 102. It should be noted that, when n0+m is equal to zero, the line feed control unit 52 defines e2 as nine.

Also, the line feed control unit 52 obtains the value e1 by digitizing the first line feed control information of the (n0+m+1)-th character (S113). Specifically, the line feed control unit 52 obtains the character code of the (n0+m+1)-th character. Thereafter, similar to the processing at S112, by referring to the glyph header 122 of the glyph data 120 corresponding to the character code, first line feed control information 134 is obtained. Then, the line feed control unit 52 digitizes the obtained first line feed control information 134 based on the line feed control information digitizing table 116 which is held in the header block 102. It should be noted that when n0+m is N, the line feed control unit 52 defines e1 as zero.

Thereafter, the line feed control unit 52 assigns e2×e1 to the element E[m] of the array of the line feed evaluation values (S114). Thereafter, the line feed control unit 52 determines whether or not the value of the variable m is equal to the value of the variable n (S115). When it is determined that the value of the variable m is not equal to the value of the variable n, the line feed control unit 52 increments the value of the variable m (S116), and repeats the processing at S112 through S115.

On the other hand, when it is determined that the value of the variable m is equal to the value of the variable n (S115), the line feed control unit 52 substitutes the value of m which satisfies the condition that the value of E[m] is the minimum value, into the variable m0 (S117). Then, the character string display unit 54 outputs the (n0+1)-th through (n0+m0)-th characters of the displaying character string as one line to the LCD 38 (S118).

It should be noted that, assuming that the first and second line feed control information are defined as shown in FIGS. 9 and 10, respectively, and that the line feed control information digitizing table is defined as shown in FIG. 11, for example, when the character string shown in FIG. 17(*b*) is a displayable character string, the array E of the line feed evaluation value results in E[0]=18, E[1]=4, E[2]=4, E[3]=4, E[4]=0, E[5]=1, E[6]=1.

In this case, as E[4] is the minimum value, the line feed control unit 52 defines the value of the variable m0 as "four", and the character string display unit 54 determines that the position between the fourth character (a half-width space) and the fifth character is a line feed position. As a result, the portion ("ABC") between the first and fourth characters of the character string shown in FIG. 17(*b*) is output as one line to the LCD 38.

Also, although the position between the characters in combination which attains the minimum line feed evaluation value is defined as a line feed position in the above, characters in combination which attain one line having the maximum number of characters arranged therein (or the widest line) among those in combinations which attain a line feed evaluation value equal to or smaller than a predetermined threshold, may be selected, and the position between the characters in that combination may be defined as a line feed position. That is, in the processing at S117, the value of m which satisfies the condition that the value of E[m] is equal to or smaller than a predetermined threshold is obtained, and the maximum value among the obtained such values may be substituted into the variable m0.

When the characters from the (n0+1)-th to the (n0+m0)-th characters of the displaying character string are to be displayed in the LCD 38, the character string display unit 54 initially obtains the character glyph image of each character as described below. That is, the character string display unit 54 initially obtains the character code of the displaying character. Thereafter, by referring to the first character map block 108 and the second character map block 110, a memory area where the glyph data 120 corresponding to the character code is held is specified. Then, a character glyph image 126 contained in the glyph data 120 is obtained.

Subsequently, the character string display unit 54 obtains the shadow glyph image of each character, as described below. That is, the character string display unit 54 initially obtains the character code of the displaying character. Then, by referring to the first character map block 108 and the second character map block 110, a memory area where the glyph data 120 corresponding to the character code is held is specified. Further, by referring to the glyph header 122 contained in the glyph data 120, shadow specification information 132 is obtained.

Thereafter, by referring to the memory area in the shadow glyph image owner map block 106 which is specified by the shadow specification information, the character string display unit 54 obtains a character number relevant to the shadow glyph image 128 (a character number relevant to the glyph data 120 which holds the shadow glyph image 128). Further, by referring to the second character map block 110, the character string display unit 54 specifies a memory area where the glyph data 120 corresponding to the character number is held. Then, the shadow glyph image 128 contained in the glyph data 120 is obtained.

Subsequently, the character string display unit 54 creates a character string layer image based on the character glyph image obtained for each character. Also, the character string display unit 54 creates a shadow layer image based on the shadow glyph image obtained for each character. Then, the character string display unit 54 places the shadow layer image on a background layer image which is separately read out, and further the character layer image on the resultant image, so that the final resultant image is displayed in the LCD 38.

The characters from the (n0+1)-th to the (n0+m0)-th characters of the displaying character string are displayed in the LCD 38. Thereafter, the character string display unit 54 determines whether or not n0+m0 is equal to N (S119).

When it is determined that n0+m0 is not equal to N, the character string display unit 54 determines that the process to output to the displaying character string to the LCD 38 to be displayed therein is not completed, and after updating n0 to n0+m0 (S120), repeats the processing at S104 through S119.

On the other hand, when it is determined that n0+m0 is equal to N, the character string display unit 54 determines that the process to output the displaying character string to the LCD 38 to be displayed therein is completed. In this case, the main processing is completed.

It should be noted that the above described processing is realized by the CPU 14 by executing a program supplied via the disk 27.

[4. Selection Reference Position Designation Unit]

The selection reference position designation unit 56 designates a position within the character string display area in the character string display unit 54, as a selection reference position. For example, in response to a designating operation carried out by a user using a pointing device or the like, the selection reference position designation unit 56 designates a position within the character string display area in the character string display unit 54.

That is, the selection reference position designation unit 56 determines whether or not a user's operation to designate a position within the character string display area in the character string display unit 54 has been carried out. Then, when it is determined that such an operation has already been carried out, the position designated by the user is obtained as a selection reference position.

[5. Selection Unit]

Based on the selection reference position designated by the selection reference position designation unit 56 and the character type information of characters included in the character string displayed in the character string display unit 54, the selection unit 58 selects a part of the character string displayed in the character string display unit 54.

For example, the selection unit 58 selects a beginning character from the characters located ahead of the selection reference position obtained by the selection reference position designation unit 56, in the character string displayed in the character string display unit 54. The selection is made based on the character type information contained for each character in the font data.

More specifically, with respect to the characters located ahead of the selection reference position obtained by the selection reference position designation unit 56, in the character string displayed in the character string display unit 54, the selection unit 58 determines whether or not each combination of two adjacent characters satisfies a predetermined beginning character condition. That is, for each combination, whether or not the character type information of the characters relevant to the combination satisfies the beginning character condition is determined. Then, a beginning character is selected based on the result of the determination.

Also, for example, the selection unit 58 selects a terminal character from the characters located subsequent to the selection reference position obtained by the selection reference position designation unit 56, in the character string displayed in the character string display unit 54. This selection is made based on the character type information contained for each character in the font data.

More specifically, with respect to the characters located subsequent to the selection reference position obtained by the reference position acquiring unit 56, in the character string displayed in the character string display unit 54, the selection unit 58 determines whether or not each combination of two adjacent characters satisfy a predetermined terminal character condition. That is, for each combination, whether or not the character type information of the characters relevant to the combination satisfies the terminal character condition is determined. Then, a terminal character is selected based on the result of the determination.

Based on the thus selected beginning and terminal characters, the selection unit 58 selects apart of the character string displayed in the character string display unit 54. For example, the portion between the beginning and terminal characters of the character string displayed in the character string display unit 54 is selected.

[6. Process Execution Unit]

The process execution unit 60 executes processing based on the portion selected by the selection unit 58, of the character string displayed in the character string display unit 54. For example, the process execution unit 60 displays the portion selected by the selection unit 58, of the character string displayed in the character string display unit 54 in a discriminable manner (highlighting, reversing, or the like).

Figure 15:
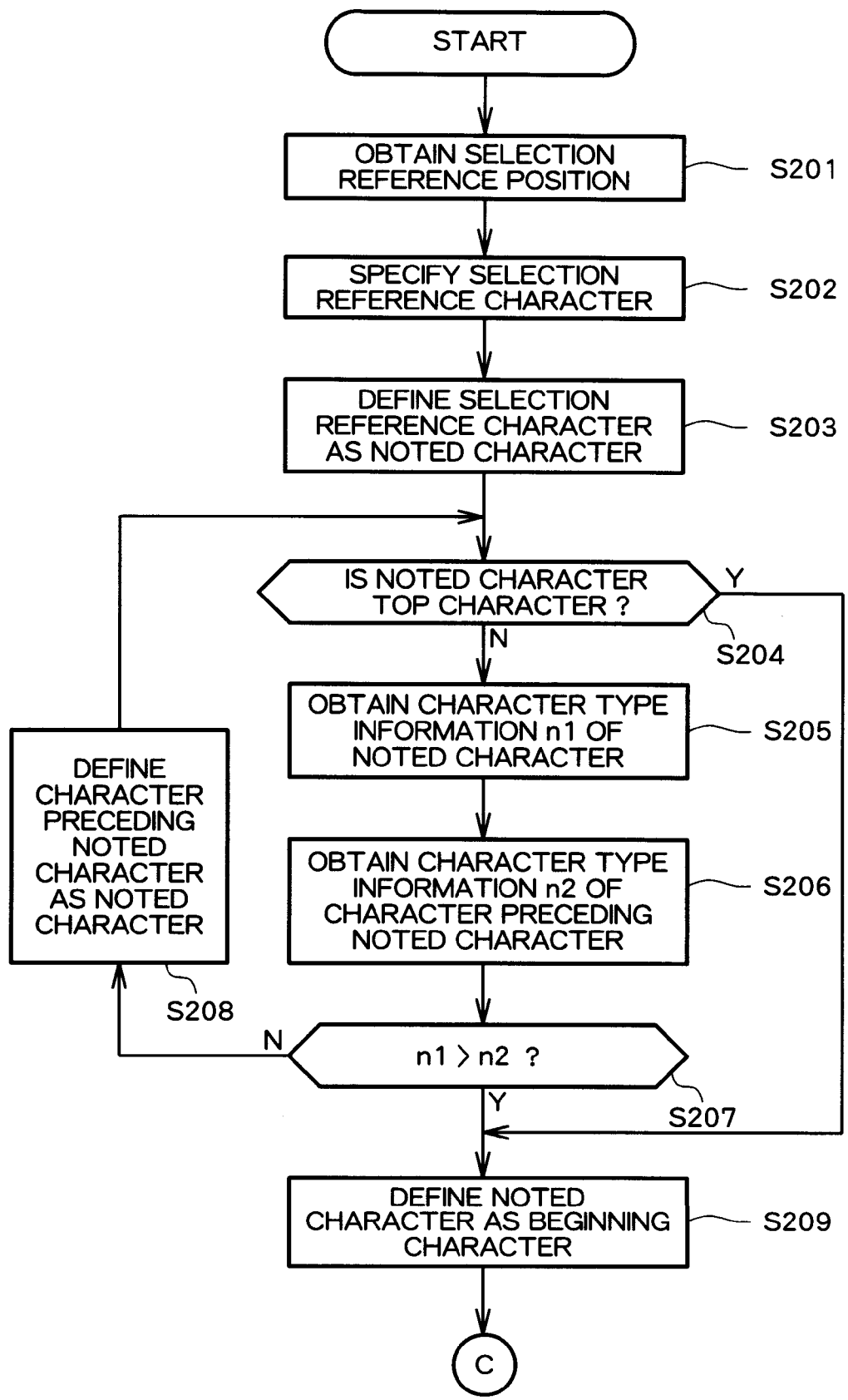
FIG. 15 is a flowchart showing processing to be executed by the portable electronic device.
Figure 16:
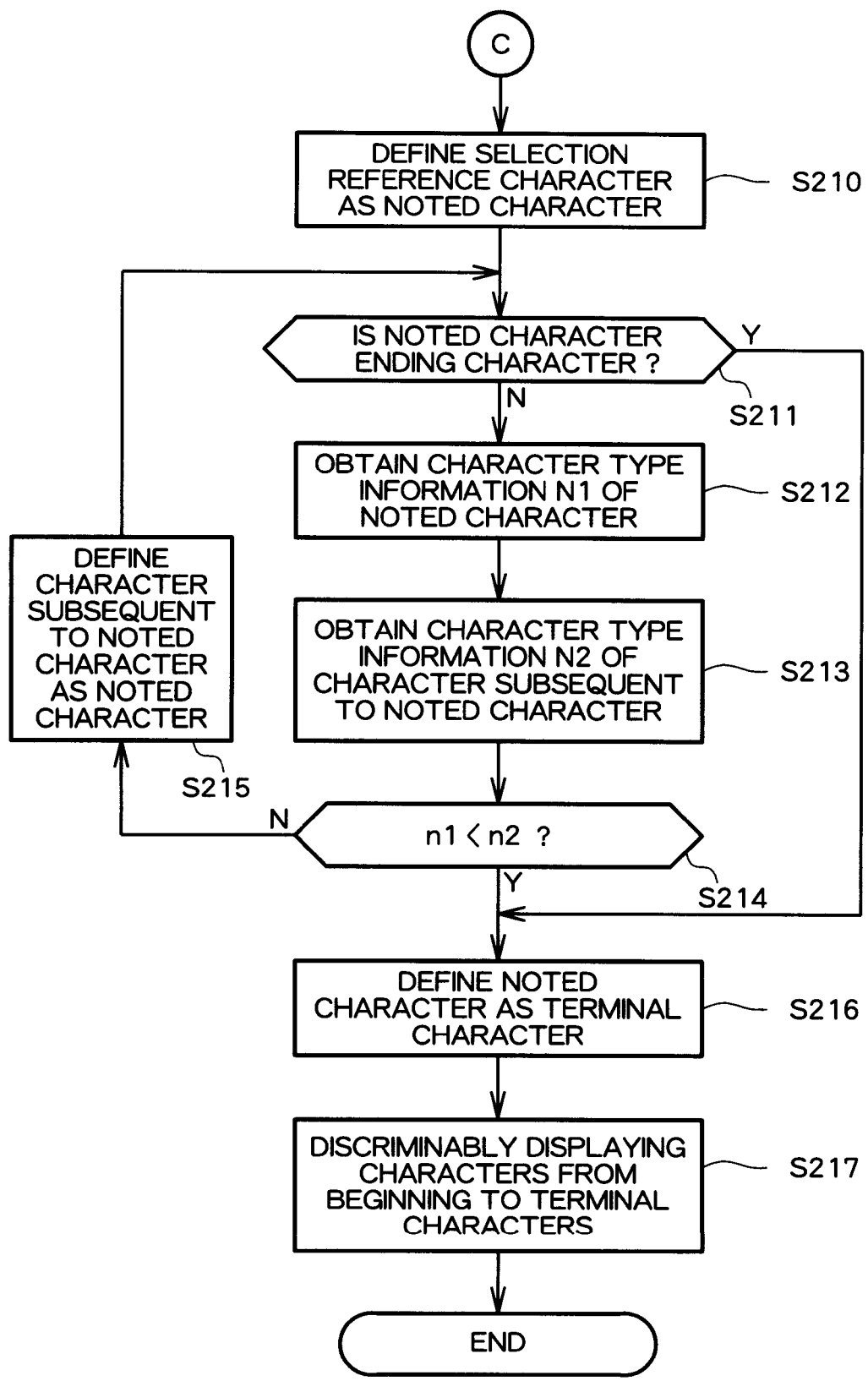
FIG. 16 is a flowchart showing processing to be executed by the portable electronic device.

Here, processing to be executed by the selection reference position designation unit 56 and the selection unit 58 when the position within the character string display area in the character string display unit 54 is designated by a user will be described. FIGS. 15 and 16 show flowcharts relevant to this processing.

In this processing, the selection reference position designation unit 56 initially obtains the position designated by the user (a selection reference position) (S201), and specifies a character corresponding to that position as a selection reference character (S202). For example, when the selection reference position is included in the display area of a certain character, the selection reference position designation unit 56 specifies that character as a selection reference character. Alternatively, a character located closest to the selection reference position, for example, is specified as a selection reference character.

The selection reference position designation unit 56 stores, in the RAM 16, the position of the selection reference character in the object character string. Also, the selection unit 58 defines the selection reference character as a noted character (S203).

Thereafter, the selection unit 58 determines whether or not the noted character is a character located at the top of the object character string (S204). When it is determined that the noted character is a character located at the top of the object character string, the noted character (the top character) is defined as a beginning character (S210).

On the other hand, when it is determined that the noted character is not a character located at the top of the object character string, the selection unit 58 obtains the value n1 by digitizing the character type information of the noted character (S205). Specifically, the selection unit 58 obtains the character code of the noted character. Thereafter, while referring to the first character map block 108, the selection unit 58 obtains the character number corresponding to the character code of the noted character. Also, while referring to the second character map block 110, the selection unit 58 obtains information for specifying a memory area where the glyph data 120 of the noted character is held. Then, while referring to the glyph header 122 contained in the glyph data 120 of the noted character, the selection unit 58 obtains the character type information 138 of the noted character. The selection unit 58 digitizes the character type information 138 based on the character type information digitizing table 118 which is held in the header block 102 (FIG. 10).

Thereafter, the selection unit 58 obtains the value n2 by digitizing the character type information of the character immediately preceding the noted character (the first one of the characters adjacent to the noted character) (S206). The acquisition of n2 is carried out similar to the processing at S205.

Thereafter, the selection unit 58 determines whether or not n1 is larger than n2 (S207). When it is determined that n1 is equal to or smaller than n2, the selection unit 58 defines the character immediately preceding the noted character as a noted character (S208), and repeats the processing at S204 through S207. On the other hand, when it is determined that n1 is larger than n2, the selection unit 58 defines the noted character as a beginning character (S209).

Then, the selection unit 58 carries out a process to determine a terminal character. Initially, the selection unit 58 defines the selection reference character as a noted character (S210).

Thereafter, the selection unit 58 determines whether or not the noted character is a character located at the end of the object character string (S211). When it is determined that the noted character is a character located at the end of the object character string, the selection unit 58 defines the noted character (an ending character) as a terminal character (S216).

On the other hand, when it is determined that the noted character is not a character located at the end of the object character string, the selection unit 58 obtains the value n1 by digitizing the character type information of the noted character (S212).

Also, the selection unit 58 obtains the value n2 by digitizing the character type information of a character located immediately subsequent to the noted character (the second one of the characters adjacent to the noted character) (S213). Acquisition of n1 and n2 is carried out similar to the acquisition carried out at S205.

Thereafter, the selection unit 58 determines whether or not n2 is larger than n1 (S214). When it is determined that n2 is equal to or smaller than n1, the selection unit 58 defines the character immediately subsequent to the noted character as a noted character (S215), and repeats the processing from S211 through S214. On the other hand, when it is determined that n2 is larger than n1, the selection unit 58 defines the noted character as a terminal character (S216).

The process execution unit 60 displays the thus selected characters, that is, the characters from the beginning to terminal characters, in the character string display unit 54 in a discriminable manner (highlighting or reversing) (S217). Specifically, similar to the case described in connection with S118, a character string layer image, a shadow layer image, and a background layer image are created or read out, and a discriminate display layer image (an image for discriminably displaying a part of a character string) is created.

Then, the character string layer image, the discriminate display layer image, the shadow layer image, and the background layer image are stacked in this order from the top to the bottom, and the resultant image is displayed in the character string display unit 54.

For example, when the character string (the displaying character string) as shown in FIG. 17(*a*) is displayed in the LCD 38 and the vicinity of the display area where the character "C" is displayed is designated by the user, the character "C" is specified as a selection reference character. Then, when the character type information and the character type information digitizing table are defined as shown in FIG. 12, the values obtained by digitizing the character type information of the characters "A", "B", "C", respectively, are all "three".

In this case, the condition to be applied at S207 (a beginning character condition) is not satisfied. Therefore, the character "A" is defined as a beginning character as the character "A" is a top character.

Also, the value obtained by digitizing the character type information of the character immediately subsequent to the character "C" (that is, the fourth character; a half-width space) is "zero", and the value obtained by digitizing the character type information of the further subsequent character (the fifth character) is "five". In this case, when the fourth character (a half-width space) is defined as a noted character, the condition (a terminal character condition) at S214 is satisfied. Therefore, the fourth character (a half-width space) is defined as a terminal character. As a result, the part ("ABC") from the first to fourth characters in the character string displayed in the LCD 38 is discriminably displayed.

It should be noted that the above described process is realized by the CPU 14 by executing a program supplied via the disk 27.

As described above, according to the portable electronic device 10, line feed control information for use in controlling line feed to be conducted before or after a character can be contained in font data, and a line feed position is determined based on the line feed control information when a character string is displayed. Therefore, according to the portable electronic device 10, Japanese hyphenation can be preferably carried out while suppressing restriction due to a character code system.

Also, conventionally, as a character to be subjected to Japanese hyphenation is designated irrespective of the font design of the character, a person engaged with designing of the font data of the character cannot commit to Japanese hyphenation. However, according to the portable electronic device 10, a person engaged with creation of the font data is allowed to commit to Japanese hyphenation when displaying based on that font data is carried out.

Also, according to the portable electronic device 10, shadow information for displaying a character as a shadowed character can be contained in the font data, and when a character is displayed as a shadowed character, that shadow information is used. Therefore, according to the portable electronic device 10, a shadowed character can be displayed while reducing the processing load.

Further, according to the portable electronic device 10, the character type information of a character can be contained in the font data and a part of the displaying character string is selected based on the character type information. Therefore, according to the portable electronic device 10, it is possible to allow a user to preferably designate a part of a character string, while suppressing restriction due to a character code system.

It should be noted that the font data described above does not depend on the font format, such as a dot font, a vector font, or the like (a format to express the shape of a character), and can be used in a variety of computers (a variety of operating systems) with a driver prepared. Therefore, the data format of the font data described above can serve as a substitution of an existing general purpose font standard such as True Type (registered trademark) font.

Also, according to the font data described above, the line feed control information, the character type information, and the associated image information, all for every character (a character code) are defined for every font (a typeface and design of a character). Therefore, as font data is incorporated into a computer upon necessity, the computer can display the character in that font in an appropriate layout.

Also, even when a character in a different font is included in a displaying character string, that character string can be displayed in an appropriate layout based on the line feed control information or the like corresponding to that character contained in the font data relevant to the respective fonts.

It should be noted that the present invention is not limited to the embodiments described above.

For example, the font data stored in the font data memory unit 50 may include information for displaying other associated images associated with each character so as to be associated with the character (associated image information) instead of, or in addition to, the information for adding a shadow to each character (a shadow glyph image 128 or shadow specification information 132). For example, information for displaying an image, including an image for indicating a character being focused, an image for imparting a particular display effect to a character (for example, an image for displaying a character so as to flash or appear like a neon, and so forth), and an image for discriminably displaying a character, so as to be associated with a character, may be contained for each character in the font data. Then, the character string display unit 54 may display the above described image so as to be associated with a character based on the font data (associated image information).

Also, although an example in which the present invention is applied to a portable electronic device is described in the above, the present invention may alternatively be applied to other computer systems, including a home-use game machine, a personal computer, and so forth.

The invention claimed is:

1. A display device, comprising:
   font data memory means for storing font data which contains a plurality of font records each containing font information for displaying a character and classification information indicative of a classification of the character;
   character string displaying means for displaying a character string based on the font information relevant to all or some of the plurality of font records;
   selection reference position designation means for designating a position within a display area, of the character string displayed in the character string displaying means, as a selection reference position;
   selection means for selecting a part of the character string based on the selection reference position designated by the selection reference position designation means and the classification information of characters included in the character string; and
   process executing means for executing a process based on the part of the character string selected by the selection means,
   wherein the selection means comprises:
   beginning character selection means for determining, for a first character and a second character located adjacent to each other ahead of the selection reference position in the character string, whether or not a value corresponding to the classification information relevant to the second character is larger than a value corresponding to the classification information relevant to the first character to select a beginning character from among characters located ahead of the selection reference position in the character string;
   terminal character selection means for determining, for a first character and a second character located adjacent to each other subsequent to the selection reference position in the character string, whether or not a value corresponding to the classification information relevant to the second character is larger than a value corresponding to the classification information relevant to the first character to select a terminal character from among characters located subsequent to the selection reference position in the character string; and
   means for selecting a part of the character string, based on the beginning character and the terminal character.

2. A display device, comprising:
   font data memory means for storing font data which contains a plurality of font records each containing font information for displaying a character and classification information indicative of a classification of the character;
   character string displaying means for displaying a character string based on the font information relevant to all or some of the plurality of font records;
   selection reference position designation means for designating a position within a display area, of the character string displayed in the character string displaying means, as a selection reference position;
   selection means for selecting a part of the character string based on the selection reference position designated by the selection reference position designation means and the classification information of characters included in the character string: and
   process executing means for executing a process based on the part of the character string selected by the selection means,
   wherein
   the selection means comprises:
   beginning character selection means for determining, while setting, as a noted character, a character corresponding to the selection reference position and characters ahead of the character corresponding to the selection reference position in the character string one by one in an order from the character corresponding to the selection reference position toward a top of the character string, whether or not a value corresponding to the classification information relevant to the noted character is larger than a value corresponding to the classification information relevant to a character ahead of the noted character by one, and not selecting the noted character as a beginning character if the value corresponding to the classification information relevant to the noted character is not larger than the value corresponding to the classification information relevant to the character ahead of the noted character by one, and selecting the noted character as the beginning character if the value corresponding to the classification information relevant to the noted character is larger than the value corresponding to the classification information relevant to the character ahead of the noted character by one;

terminal character selection means for determining, while setting, as a noted character, a character corresponding to the selection reference position and characters subsequent to the character corresponding to the selection reference position in the character string one by one in an order from the character corresponding to the selection reference position toward an end of the character string, whether or not a value corresponding to the classification information relevant to a character subsequent to the noted character by one is larger than a value corresponding to the classification information relevant to the noted character, and not selecting the noted character as a terminal character if the value corresponding to the classification information relevant to the character subsequent to the noted character by one is not larger than the value corresponding to the classification information relevant to the noted character, and selecting the noted character as a terminal character if the value corresponding to the classification information relevant to the character subsequent to the noted character by one is larger than the value corresponding to the classification information relevant to the noted character; and means for selecting a part of the character string based on the beginning character and the terminal character, the classification information indicates at least whether a character is kanji, hiragana, or a punctuation mark, a value corresponding to the classification information indicating that a character is kanji is larger than a value corresponding to the classification information indicating that a character is hiragana, and a value corresponding to the classification information indicating that a character is hiragana is larger than a value corresponding to the classification information indicating that a character is a punctuation mark.

3. A control method for a display device, comprising:

a font data reading step of reading font data from font data memory means which stores font data which contains a plurality of font records each containing font information for displaying a character and classification information indicative of a classification of the character;

a character string displaying step of displaying a character string by a character string displaying means based on the font information relevant to all or some of the plurality of font records contained in the font data which is read out at the font data reading step;

a selection reference position designation step of designating a position within a display area, of the character string displayed in the character string displaying means, as a selection reference position;

a selection step of selecting a part of the character string based on the selection reference position designated at the selection reference position designation step and the classification information of characters included in the character string; and a process executing step of executing a process based on the part of the character string selected at the selection step, wherein the selection step comprises:

a beginning character selection step of determining, for a first character and a second character located adjacent to each other ahead of the selection reference position in the character string, whether or not a value corresponding to the classification information relevant to the second character is larger than a value corresponding to the classification information relevant to the first character to select a beginning character from among characters located ahead of the selection reference position in the character string;

a terminal character selection step of determining, for a first character and a second character located adjacent to each other subsequent to the selection reference position in the character string, whether or not a value corresponding to the classification information relevant to the second character is larger than a value corresponding to the classification information relevant to the first character to select a terminal character from among characters located subsequent to the selection reference position in the character string; and a step of selecting a part of the character string, based on the beginning character and the terminal character.

4. A non transitory computer readable information storage medium storing a program for causing a computer to function as:

character string displaying means for displaying a character string based on font information relevant to all or some of a plurality of font records contained in font data which contains the plurality of font records each containing the font information for displaying a character and classification information indicative of a classification of the character;

selection reference position designation means for designating a position within a display area, of the character string displayed in the character string displaying means, as a selection reference position;

selection means for selecting a part of the character string based on the selection reference position designated by the selection reference position designation means and the classification information of characters included in the character string; and process executing means for executing a process based on the part of the character string selected by the selection means, wherein the selection means comprises:

beginning character selection means for determining, for a first character and a second character located adjacent to each other ahead of the selection reference position in the character string, whether or not a value corresponding to the classification information relevant to the second character is larger than a value corresponding to the classification information relevant to the first character to select a beginning character from among characters located ahead of the selection reference position in the character string;

terminal character selection means for determining, for a first character and a second character located adjacent to each other subsequent to the selection reference position in the character string, whether or not a value corresponding to the classification information relevant to the second character is larger than a value corresponding to the classification information relevant to the first character to select a terminal character from among characters located subsequent to the selection reference position in the character string; and means for selecting a part of the character string, based on the beginning character and the terminal character.

5. A control method for a display device, comprising:

a font data reading step of reading font data from font data memory means which stores font data which contains a plurality of font records each containing font information for displaying a character and classification information indicative of a classification of the character;

a character string displaying step of displaying a character string by a character string displaying means based on the font information relevant to all or some of the plurality of font records contained in the font data which is read out at the font data reading step;

a selection reference position designation step of designating a position within a display area, of the character string displayed in the character string displaying means, as a selection reference position;

a selection step of selecting a part of the character string based on the selection reference position designated at the selection reference position designation step and the classification information of characters included in the character string; and a process executing step of executing a process based on the part of the character string selected at the selection step, wherein the selection step comprises:

a beginning character selection step of determining, while setting, as a noted character, a character corresponding to the selection reference position and characters ahead of the character corresponding to the selection reference position in the character string one by one in an order from the character corresponding to the selection reference position toward a top of the character string, whether or not a value corresponding to the classification information relevant to the noted character is larger than a value corresponding to the classification information relevant to the character ahead of the noted character by one, and not selecting the noted character as a beginning character if the value corresponding to the classification information relevant to the noted character is not larger than the value corresponding to the classification information relevant to the character ahead of the noted character by one, and selecting the noted character as the beginning character if the value corresponding to the classification information relevant to the noted character is larger than the value corresponding to the classification information relevant to the character ahead of the noted character by one;

a terminal character selection step of determining, while setting, as a noted character, a character corresponding to the selection reference position and characters subsequent to the character corresponding to the selection reference position in the character string one by one in an order from the character corresponding to the selection reference position toward an end of the character string, whether or not a value corresponding to the classification information relevant to a character subsequent to the noted character by one is larger than a value corresponding to the classification information relevant to the noted character, and not selecting the noted character as a terminal character if the value corresponding to the classification information relevant to the character subsequent to the noted character by one is not larger than the value corresponding to the classification information relevant to the noted character, and selecting the noted character as a terminal character if the value corresponding to the classification information relevant to the character subsequent to the noted character by one is larger than the value corresponding to the classification information relevant to the noted character; and a step of selecting a part of the character string based on the beginning character and the terminal character, the classification information indicates at least whether a character is kanji, hiragana, or a punctuation mark, a value corresponding to the classification information indicating that a character is kanji is larger than a value corresponding to the classification information indicating that a character is hiragana, and a value corresponding to the classification information indicating that a character is hiragana is larger than a value corresponding to the classification information indicating that a character is a punctuation mark.

6. A non transitory computer readable information storage medium storing a program for causing a computer to function as:

character string displaying means for displaying a character string based on font information relevant to all or some of a plurality of font records contained in font data which contains the plurality of font records each containing the font information for displaying a character and classification information indicative of a classification of the character;

selection reference position designation means for designating a position within a display area, of the character string displayed in the character string displaying means, as a selection reference position;

selection means for selecting a part of the character string based on the selection reference position designated by the selection reference position designation means and the classification information of characters included in the character string; and process executing means for executing a process based on the part of the character string selected by the selection means, wherein the selection means comprises:

beginning character selection means for determining, while setting, as a noted character, a character corresponding to the selection reference position and characters ahead of the character corresponding to the selection reference position in the character string one by one in an order from the character corresponding to the selection reference position toward a top of the character string, whether or not a value corresponding to the classification information relevant to the noted character is larger than a value corresponding to the classification information relevant to a character ahead of the noted character by one, and not selecting the noted character as a beginning character if the value corresponding to the classification information relevant to the noted character is not larger than the value corresponding to the classification information relevant to the character ahead of the noted character by one, and selecting the noted character as the beginning character if the value corresponding to the classification information relevant to the noted character is larger than the value corresponding to the classification information relevant to the character ahead of the noted character by one;

terminal character selection means for determining, while setting, as a noted character, a character corresponding to the selection reference position and characters subsequent to the character corresponding to the selection reference position in the character string one by one in an order from the character corresponding to the selection reference position toward an end of the character string, whether or not a value corresponding to the classification information relevant to a character subsequent to the noted character by one is larger than a value corresponding to the classification information relevant to the noted character, and not selecting the noted character as a terminal character if the value corresponding to the classification information relevant to the character subsequent to the noted character by one is not larger than the value corresponding to the classification information relevant to the noted character, and selecting the noted character as a terminal character if the value corresponding to the classification information relevant to the character subsequent to the noted character by one is larger than the value corresponding to the classification information relevant to the noted character; and means for selecting a part of the character string based on the beginning character and the terminal character, wherein:

the classification information indicates at least whether a character is kanji, hiragana, or a punctuation mark, a value corresponding to the classification information indicating that a character is kanji is larger than a value corresponding to the classification information indicating that a character is hiragana, and a value corresponding to the classification information indicating that a character is hiragana is larger than a value corresponding to the classification information indicating that a character is a punctuation mark.

\* \* \* \* \*